US012726401B2

(12) United States Patent
Shi et al.

(10) Patent No.: US 12,726,401 B2
(45) Date of Patent: Sep. 1, 2026

(54) METHOD AND DEVICE FOR CONFIGURING NETWORK ELEMENT, AND STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Nanxiang Shi, Beijing (CN); Lu Lu, Beijing (CN)

(73) Assignees: China Mobile Communication Co., LTD Research Institute, Beijing (CN); China Mobile Communication Group Co., LTD., Beijing (CN)

( * ) Notice: Subject to any disclaimer, the term of this patent is extended or adjusted under 35 U.S.C. 154(b) by 165 days.

(21) Appl. No.: 18/715,950

(22) PCT Filed: Dec. 30, 2022

(86) PCT No.: PCT/CN2022/143974
§ 371 (c)(1),
(2) Date: Jun. 3, 2024

(87) PCT Pub. No.: WO2023/125943
PCT Pub. Date: Jul. 6, 2023

(65) Prior Publication Data

US 2025/0047557 A1 Feb. 6, 2025

(30) Foreign Application Priority Data

Dec. 31, 2021 (CN) ......................... 202111659097.3

(51) Int. Cl.
*H04L 41/0806* (2022.01)
*H04L 12/715* (2013.01)

(52) U.S. Cl.
CPC ................................ *H04L 41/0806* (2013.01)

(58) Field of Classification Search
CPC ... H04L 41/0806; H04L 41/12; H04L 41/145; H04L 41/0893; H04L 41/5019; H04W 24/02; H04W 84/06
See application file for complete search history.

(56) References Cited

U.S. PATENT DOCUMENTS 11,134,402 B1 * 9/2021 Boyapati ............... H01M 10/48
2021/0176192 A1 * 6/2021 Li ......................... H04L 47/781

(Continued)

FOREIGN PATENT DOCUMENTS

CN 105847035 A 8/2016
CN 107466051 A 12/2017

(Continued)

OTHER PUBLICATIONS

International Search Report and Written Opinion for corresponding PCT/CN2022/143974, mailed Feb. 16, 2023 (13 pages).

*Primary Examiner* — Schquita D Goodwin
(74) *Attorney, Agent, or Firm* — Maginot, Moore & Beck, LLP

(57) ABSTRACT

A method for configuring a network element includes: acquiring a plurality of network atomic functions of a node within a target area; integrating the plurality of network atomic functions into a plurality of network molecular functions, in which each of the plurality of network molecular functions includes at least one network element 5 atomic function; and configuring the network element for the node according to node capability information of the node, in which the network element corresponds to a group of network molecular functions, and the group of network molecular functions includes at least one network molecular function.

20 Claims, 5 Drawing Sheets

(56) References Cited

U.S. PATENT DOCUMENTS

2022/0052922 A1* 2/2022 Meyer .................. G06F 16/252
2022/0166679 A1* 5/2022 Hafeez .................. H04L 41/145
2022/0224605 A1* 7/2022 Jain ..................... G06F 9/30043
2023/0110591 A1* 4/2023 Routt ...................... G06F 15/16
706/12
2023/0156826 A1* 5/2023 Palermo ................ H04W 76/10
370/329

FOREIGN PATENT DOCUMENTS

CN 111698691 A 9/2020
CN 113300881 A 8/2021
WO 2021249432 A1 12/2021

* cited by examiner 600
processor
620
memory
bus interface
610
transceiver

METHOD AND DEVICE FOR CONFIGURING NETWORK ELEMENT, AND STORAGE MEDIUM

CROSS-REFERENCE TO RELATED APPLICATION

This application is a national phase of International Application No. PCT/CN2022/143974, filed on Dec. 30, 2022, which is based on and claims priority to Chinese Patent Application No. 202111659097.3, filed on Dec. 31, 2021, the entire content of which is incorporated herein by reference.

TECHNICAL FIELD

The disclosure relates to the field of communication technologies, and particularly to a method and a device for configuring a network element, and a non-transitory computer-readable storage medium.

BACKGROUND

With the rapid advancements in high-throughput satellite communication technologies and low-earth orbit satellite communication technologies, communication capabilities of satellite networks in terms of capacity, speed, latency and reliability are continually being enhanced, which may form, with terrestrial fixed/mobile networks, a complementary and cooperative integrated fixed, mobile and satellite network.

In the integrated fixed, mobile and satellite network, due to weaker computational, storage, and connectivity capabilities of a space-based node, a network function of a ground-based network element may not be deployed, or communication capacity/communication performance is greatly reduced after the network function of the ground-based network element is deployed. However, in the related art, a network function contained when the same network element in the space-based network and the ground-based network is deployed in a space-based network node or a ground-based network node may be the same, which results in the poor communication effect of the node.

SUMMARY

According to a first aspect, a method for configuring a network element is provided according to embodiments of the disclosure, and includes: acquiring a plurality of network atomic functions of a node within a target area; integrating the plurality of network atomic functions into a plurality of network molecular functions, in which each of the plurality of network molecular functions includes at least one network atomic function; and configuring the network element for the node according to node capability information of the node, in which the network element corresponds to a group of network molecular functions, and the group of network molecular functions includes at least one network molecular function.

According to a second aspect, a communication device is further provided according to embodiments of the disclosure, and includes a transceiver, a memory, a processor and a program stored on the memory and executable by the processor, in which the processor is configured to read the program in the memory to implement steps of the method as described in the first aspect according to embodiments of the disclosure.

According to a third aspect, a readable storage medium storing a program is provided according to embodiments of the disclosure. When the program is executed by a processor, steps of the method as described in the first aspect according to embodiments of the disclosure are implemented.

BRIEF DESCRIPTION OF THE DRAWINGS

To explain the technical solutions of the disclosure more clearly, the drawings described in embodiments or the related art will be briefly introduced below. Obviously, the drawings described as below are only some embodiments of the disclosure. Those skilled in the art may obtain other drawings according to these drawings without any creative work.

DETAILED DESCRIPTION

The technical solutions according to embodiments of the disclosure will be described clearly and completely in combination with the appended drawings according to embodiments of the disclosure. It is obvious that the embodiments described are part of embodiments of the disclosure, rather than all embodiments. On the basis of embodiments of the disclosure, all other embodiments obtained by those skilled in the art without creative work are within the protection scope of the disclosure.

The “first”, “second” or similar terms used according to embodiments of the disclosure are used to distinguish similar objects, rather than describe a specific order or a precedence order. In addition, terms “comprise/include” and “have” and any variations thereof are intended to cover non-exclusive inclusions. For example, a process, method, system, product, or device, comprising/including a series of steps or units is not limited to the listed steps or units, but may further include steps or units not listed inherent to such process, method, product or device. In addition, “and/or” used in the disclosure indicates at least one of connected objects. For example, A and/or B and/or C, may represent any of existing A only, existing B only, existing C only, existing both A and B, existing both B and C, existing both A and C, and existing all A, B and C.

Figure 1:
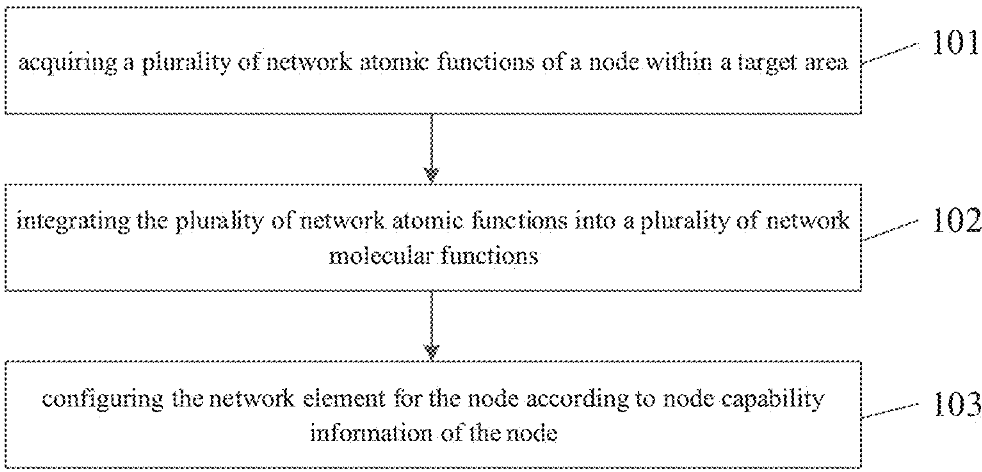
FIG. 1 is a flowchart illustrating a method for configuring a network element according to embodiments of the disclosure.

Referring to FIG. 1, FIG. 1 is a flowchart illustrating a method for configuring a network element according to embodiments of the disclosure. As illustrated in FIG. 1, the method includes following steps.

At step 101, a plurality of network atomic functions of a node within a target area are acquired.

The target area may be determined according to a three-dimensional geographic space. For example, a territorial fixed node, a territorial mobile network node and a satellite node, located in the three-dimensional geographic space, are included in an integrated fixed, mobile and satellite network. A plurality of nodes in the three-dimensional geographic space may be determined according to a selection within the target area.

The network atomic function may be understood as an essential functional element that cannot be subdivided in each node network function, that is, the network function may be segmented according to a minimum granularity to obtain network atomic functions.

At step 102, the plurality of network atomic functions are integrated into a plurality of network molecular functions. Each of the plurality of network molecular functions includes at least one network element atomic function.

It may be understood that, the network molecular function is a whole constituted by the integrated network atomic functions according to a certain arrangement order and space.

Optionally, integrating the plurality of network atomic functions into the plurality of network molecular functions includes:

acquiring at least one of a timing relationship, a logical relationship or a geographic relationship among the plurality of network atomic functions; and integrating the plurality of network atomic functions into the plurality of network molecular functions according to the at least one of the timing relationship, the logical relationship or the geographic relationship among the plurality of network atomic functions.

The timing relationship may include a sequence, a time point, a time period, etc. The logical relationship includes an AND operation, an OR operation, a NOT operation, condition, switch, branch, etc. The geographic relationship includes a three-dimensional geographic area located and a three-dimensional motion trajectory. For example, for the terrestrial fixed node, the three-dimensional geographic area where the node is located may be understood as an installation location of the node. For the terrestrial mobile node or the satellite node, the three-dimensional geographic area where the node is located may be understood as a three-dimensional geographic location where the node is located at a certain moment and three-dimensional geographic locations where the node may occur at other moments. In case of the satellite node, there may be a three-dimensional motion trajectory. For example, the satellite node may be divided into a low-earth orbit satellite and a medium-earth orbit satellite according to the three-dimensional motion trajectory.

In the implementation, the plurality of network atomic functions are integrated into the plurality of network molecular functions according to the at least one of the timing relationship, the logical relationship or the geographic relationship among the plurality of network atomic functions, so that the arrangement and integration of the network molecular function may be achieved.

At step 103, the network element is configured for the node according to node capability information of the node. The network element corresponds to a group of network molecular functions. The group of network molecular functions includes at least one network molecular function.

The node capability information may correspond to each node one to one. That is, the node capability information of each node may be different. The node capability information specifically may include elements such as a node resource, a node mobility, a node robustness and a network function support degree. A corresponding network element may be configured for each node according to the above elements, to acquire one or more network molecular functions correspondingly, and integrate the one or more network molecular functions into the group of network molecular functions as the network element configured.

The network element is configured for the node, which may be understood that each node autonomously configures the network element. For example, for each node, the plurality of network molecular functions may be acquired according to the above step 101 and step 102, and the group of network molecular functions constituted by the plurality of network molecular functions are configured as the network element according to the node capability information of the node itself. That is, each node may autonomously load the network element and maintain the network element, to achieve the autonomous construction and management of the network element. That is, the method for configuring the network element according to embodiments of the disclosure may be executed by any one node in the network. Each node in the network may configure the network element according to the node capability information itself. For example, in the integrated fixed, mobile and satellite network, the space-based network node may acquire the plurality of network atomic functions and integrate the plurality of network atomic functions into the plurality of network molecular functions, and integrate the plurality of network molecular functions into the network element according to the node capability information of the space-based network node, so that a self-organized configuration network element on the space-based network node is implemented. The ground-based network node may acquire the plurality of network atomic functions and integrate the plurality of network atomic functions into the plurality of network molecular functions, and integrate the plurality of network molecular functions into the network element according to the node capability information of the ground-based network node, so that a self-organized configuration network element on the ground-based network node is implemented. The space-based network node and the ground-based network node may achieve the configuration of the network elements according to their own node capability information, and implement corresponding network function, rather than the direct deployment of the same network element with the same network function.

It may be understood that, the network function of the network element configured by the node is determined according to the node capability information of the node, that is, when the same network element is deployed in different network environments, the network function included in the network element may be different, and the type of the network element and the network function of the network element are adapted to the node, so that the influence on the communication capacity or communication performance of the node when the same network element is deployed in different nodes may be avoided.

According to embodiments of the disclosure, the plurality of network atomic functions of the node within the target area are acquired; the plurality of network atomic functions are integrated into the plurality of network molecular functions, in which each of the plurality of network molecular functions includes at least one network element atomic function; and the network element is configured for the node according to the node capability information of the node, that is, the group of network molecular functions corresponding to the network element configured for the node is adapted to the node capability information of the node. In other words, the network element configured for the node is adapted to the node capability information of the node, which avoids that the communication capacity or performance of the node is affected adversely since the network function of the network element configured for the node is not adapted to the node, enhancing the communication effect of the node.

Optionally, acquiring the plurality of network atomic functions of the node within the target area at step 101 includes:

- acquiring network function information of the node within the target area within a preset time period; and
- segmenting and grouping a network function of the node within the target area into the plurality of network atomic functions according to the network function information.

According to some embodiments, the network function information of the node is related to elements such as time, space and node capability information. The preset time period may be a preset time period before a current moment, which is determined according to the requirement, so that the network element may be configured according to a dynamic topological relationship among nodes, that is, the type and the network function of the network element may be dynamically configured according to the network function of the node within the preset time period, so that the configured network element may adapt to the dynamic topological network.

The above network function information may include description information of the node network function, for example, the node network function and elements constituting the network function, so that the network function of the node may be segmented and grouped according to the network function information, to form the network atomic functions.

According to some embodiments, the network function of each node may be pre-injected into a resource pool, so that the network function information may be acquired by directly interacting with other nodes, or may be acquired according to the resource pool.

In the implementation, the network function information of the node is network function information within the preset time period, that is, the plurality of network atomic functions acquired are the network function of the node within the target area within the preset time period. The network molecular functions obtained by integrating the plurality of network atomic functions are adapted to the preset time period, and the network element configured for the node may correspond to the network function within the preset time period, so that a dynamic configuration of the network element is implemented, and the communication effect of the node is further enhanced.

Optionally, before the plurality of network atomic functions are integrated into the plurality of network molecular functions at step 102, the method further includes:

- establishing a plurality of network atomic function resource pools; and
- injecting the plurality of network atomic functions into corresponding network atomic function resource pools, respectively.

Integrating the plurality of network atomic functions into the plurality of network molecular functions at step 102 includes:

integrating a plurality of network atomic functions in the plurality of network atomic function resource pools into the plurality of network molecular functions.

The network atomic function resource pools may be configured according to types of the plurality of network atomic functions. For example, the network function may include network function elements such as a control plane capability, a user plane capability, a data plane capability, a management plane capability and a service plane capability, and network atomic function pools corresponding to the above elements may be established: a control plane capability resource pool, a user plane capability resource pool, a data plane capability resource pool, a management plane capability resource pool and a service plane capability resource pool. In addition, the network function elements may be divided into common resources (network function elements possessed by a plurality of nodes) and specific resources (network function elements possessed by only one node), and the network function elements may be processed according to a module level or a parameter level to obtain network atomic functions, and the network atomic functions are injected into corresponding network atomic function resource pools. For example, in case of the module-level processing, a network function element 1-1 of a node 1 includes capability modules A, B, C, and a network function element 1-2 of a node 2 includes capability modules B, C, D, and the network function element 1-1 serves the same purpose as the network function element 1-2, in which case the network function element 1-1 and the network function element 1-2 may be integrated into a network atomic function 1, and the network atomic function 1 includes capability modules A, B, C, D. For another example, in case of the parameter-level processing, the capability module B of the network function element 1-1 of the node 1 includes parameters P1, P2, P3, and the capability module B of the network function element 1-2 of the node 2 includes parameters P2, P3, P4, in which case the capability module B of the node 1 and the capability module B of the node 2 may be integrated with the module B of the network atomic function 1, and the module B includes parameters P1, P2, P3, P4.

In addition, before the plurality of network atomic function resource pools are established, the network function of each node may be recorded using a network node description file. Specifically, the network node description file may include the control plane capability, the user plane capability, the data plane capability, the management plane capability and the service plane capability, and a resource index database may be established to implement an index of elements for constituting the network function of each node.

According to some embodiments, the plurality of network atomic function pools may be established before step 101, so that the plurality of network atomic functions at step 101 may be acquired from the plurality of network atomic function pools. The network atomic functions in the plurality of network atomic function pools may be injected by any one node. For example, when the network function of each node may be segmented into the network atomic functions, and then the network atomic functions are injected into corresponding network atomic function pools, or the network atomic functions after division may be sent to a certain target node, and the target node uniformly injects them into the plurality of network atomic function pools.

Each network atomic function may be injected into the corresponding network atomic function resource pool. For example, a fifth generation (5G) access and mobility management function (AMF) may be segmented into network attached storage (NAS) signaling processing, access control, registration management, connection management, mobility restriction, reachability management, handover management, network element selection and other network element functions. The NAS signaling processing, access control, connection management, mobility restriction, reachability management, handover management, and network element selection may be injected into the control plane capability resource pool, and registration management may be injected into the data plane capability resource pool.

It may be understood that, the network molecular function is formed by constituted network atomic functions according to a certain arrangement manner, and the network atomic functions constituting the network molecular function may be obtained according to the plurality of network atomic function resource pools, that is, each of the network atomic functions constituting the network molecular function may be obtained directly according to the corresponding network atomic function resource pool.

In the implementation, the plurality of network atomic functions are respectively injected into corresponding network atomic function resource pools, and the plurality of network atomic functions in the plurality of network atomic function resource pools are integrated into the plurality of network molecular functions, that is, the arrangement of the plurality of network molecular functions may be directly performed according to the network atomic function resource pools, which is convenient in operation.

Optionally, after configuring the network element for the node within the target area according to the node capability information of the node at step 103, the method further includes:

- acquiring a plurality of network elements within the target area;
- dividing the plurality of network elements into at least one autonomous domain; and
- constructing intra-domain networking and inter-domain networking according to the at least one autonomous domain. The intra-domain networking is configured to achieve point-to-point communication between network elements within the autonomous domain. The inter-domain networking is configured to achieve group-to-group communication between autonomous domains.

After the node within the above target area configures the network element according to the node information capability of the node, the plurality of network elements within the target area may be divided into a plurality of clusters according to the clustering algorithm. Each cluster is an autonomous domain. According to the point-to-point communication between network elements within each autonomous domain and the group-to-group communication between autonomous domains, the dynamic interaction and dynamic collaboration of network functions are implemented.

In the implementation, the plurality of network elements are divided into at least one autonomous domain. The intra-domain networking and the inter-domain networking are constructed according to the at least one autonomous domain, so that the point-to-point communication between the network elements within the autonomous domain and the group-to-group communication between the autonomous domains are implemented.

Optionally, dividing the plurality of network elements into the at least one autonomous domain includes:

- dividing the plurality of network elements into the at least one autonomous domain according to a clustering algorithm.

The clustering algorithm is implemented according to at least one of:

- time, space, node capability information, network function or communication connection information.

It may be understood that, when the plurality of network elements are divided using the clustering algorithm, the clustering algorithm may be implemented according to one or more of the time, the space, the node capability information, the network function or the communication connection information, so that the dynamic collaboration between the network elements within each autonomous domain and between the autonomous domains may be implemented.

A plurality of optional implementations introduced in embodiments of the disclosure may be implemented in combination without conflicting with each other, or may be implemented separately, which will not be limited in embodiments of the disclosure.

For convenience of understanding, examples are as follows.

Figure 2:
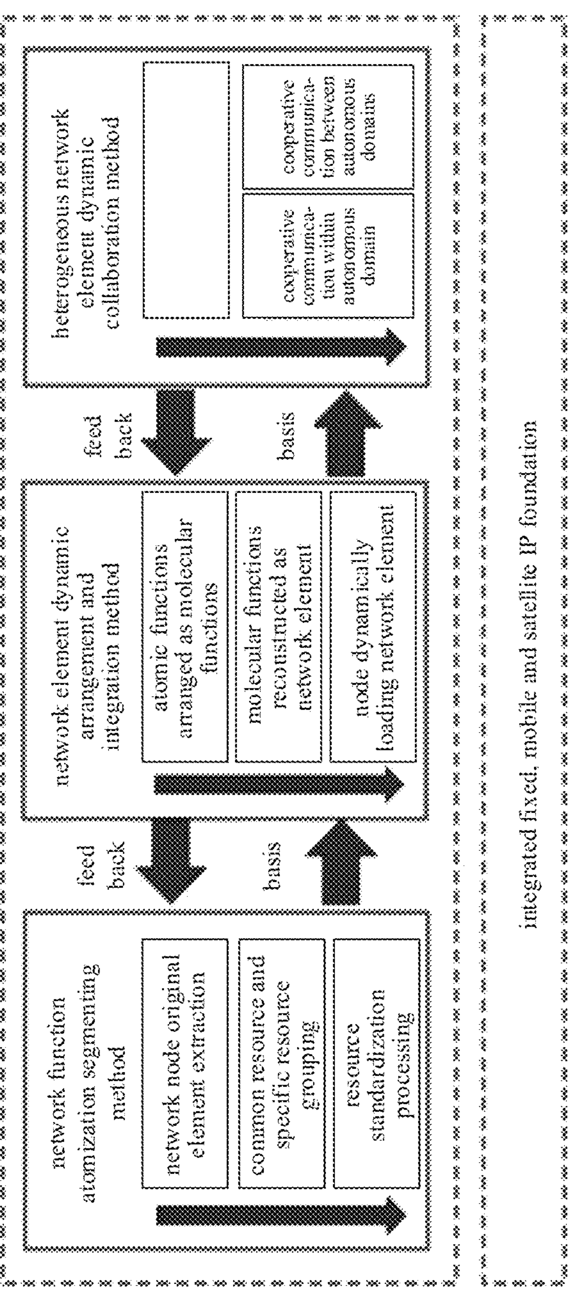
FIG. 2 is a diagram illustrating a system for segmenting, deploying and collaborating network function according to embodiments of the disclosure.
Figure 3:
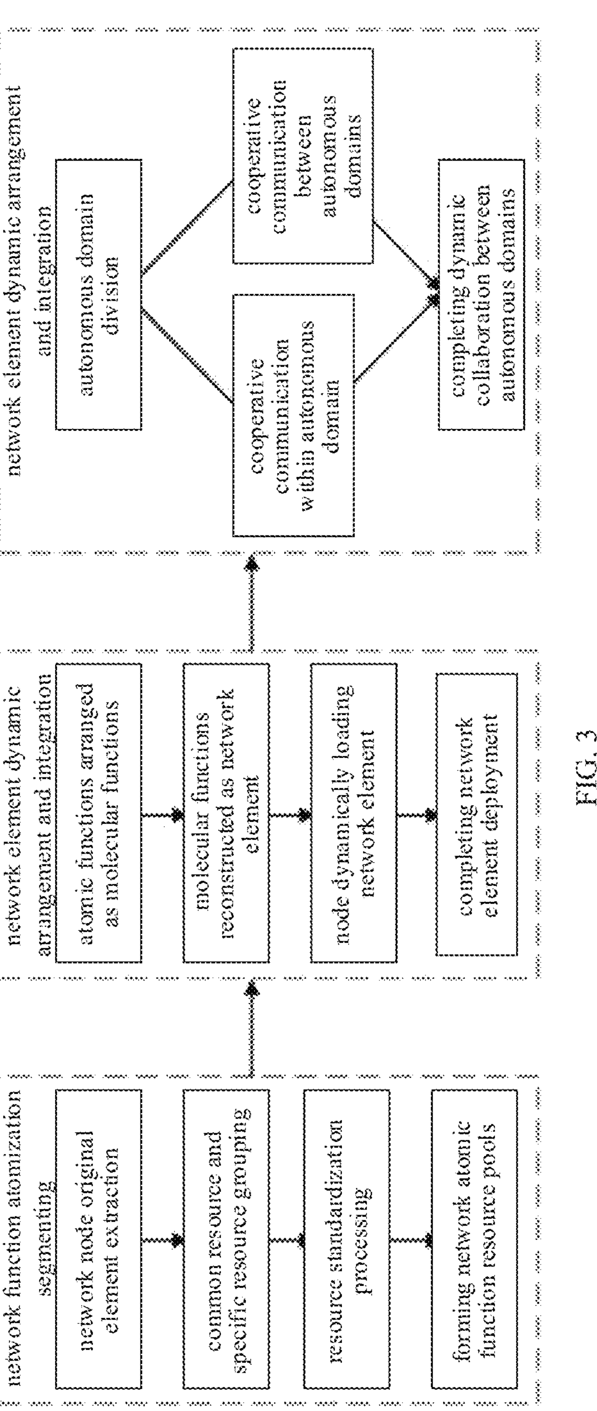
FIG. 3 is a diagram illustrating a method for segmenting, deploying and collaborating network function according to embodiments of the disclosure.

As illustrated in FIG. 2, a system for dynamically segmenting, deploying and collaborating network functions is further provided according to embodiments of the disclosure, and is applied to an integrated fixed, mobile and satellite network. The system is based on an integrated fixed, mobile and satellite internet protocol (IP) foundation (that is, a fixed node, a mobile node and a satellite node adopt a unified IP protocol), and includes a network function atomization segmenting method, a network element dynamic arrangement and integration method and a heterogeneous network element dynamic collaboration method. As illustrated in FIG. 3, based on an integration of the network function atomization segmenting method, the network element dynamic arrangement and integration method and the heterogeneous network element dynamic collaboration method, dynamic segmentation, deployment and collaboration of network functions are implemented in the integrated fixed, mobile, satellite network.

The network function atomization segmenting method specifically may include steps as follow.

At step 11, based on a specific time period and a specific three-dimensional geographic space, network functions of space-based network nodes and ground-based network nodes within a designated area are extracted and grouped, to implement extraction of original elements of network nodes.

At step 12, the network functions are segmented and grouped into network atomic functions according to a minimum granularity, including common resources and specific resources.

At step 13, resource standardization processing, includes module-level decomposition and integration, and parameter-level decomposition and integration.

At step 14, network atomic function resource pools of the area may be formed. The network atomic function resource pools include a control plane capability resource pool, a user plane capability resource pool, a data plane capability resource pool, a management plane capability resource pool and a service plane capability resource pool.

Network functions are extracted and grouped for space-based network nodes and ground-based network nodes within the designated area (namely, the specific time period and the specific three-dimensional geographic space) in combination with node capabilities of nodes within the designated area, to form a network node description file including original elements such as the control plane capability, the user plane capability, the data plane capability, the management plane capability and the service plane capability, and a resource index database. Then, the network functions are segmented and grouped into network atomic functions according to the minimum granularity. Specifically, common resources and specific resources may be set, and standardization processing may be performed (including module-level decomposition and integration and parameter-level decomposition and integration), and network atomic function resource pools of the area are constructed. The network atomic function resource pools include a control plane capability resource pool, a user plane capability resource pool, a data plane capability resource pool, a management plane capability resource pool and a service plane capability resource pool. For example, the 5G AMF is segmented into network atomic functions such as NAS signaling processing, access control, registration management, connection management, mobility restriction, reachability management, handover management, and network element selection, and network atomic functions are injected into different capability resource pools.

The network element dynamic arrangement and integration method specifically may include steps as follow.

At step 21, a timing relationship, a logical relationship and a geographic relationship are added among the network atomic functions, and the network atomic functions are autonomously arranged and integrated into network molecular functions.

At step 22, a group of network molecular functions is arranged and integrated into the network element according to a space-based or ground-based node capability.

At step 23, the network element is self-organized and dynamically loaded and maintained on the space-based or ground-based node.

At step 24, network element deployment is completed in the integrated fixed, mobile and satellite network.

According to multi-modality service requirements of the area, such as communication, navigation, remote sensing, telemetering and military, an operation is performed based on the network atomic function resource pools. The network atomic functions are autonomously arranged and integrated into the network molecular functions by adding the timing relationship, the logical relationship and the geographic relationship among the network atomic functions. The timing relationship includes a sequence, a time point, a time period, etc. The logical relationship includes an AND operation, an OR operation, a NOT operation, condition, switch, branch, etc. The geographic relationship includes a three-dimensional geographic area and a three-dimensional motion trajectory. Then, according to the space-based or ground-based node capabilities (including elements such as node resources, node mobility, node robustness, network function support degree), a group of network molecular functions is autonomously arranged and integrated into the network element, and the network element is self-organized and dynamically loaded and maintained on the space-based node or the ground-based node, so that the autonomous construction and management of the network element are implemented.

The heterogeneous network element dynamic collaboration method specifically may include steps as follow.

At step 31, network elements in the designated area are divided into a plurality of autonomous domains according to a clustering algorithm of elements such as time, space, node capability, network function and communication connection.

At step 32, point-to-point cooperative communication is performed within the autonomous domain, and group-to-group cooperative communication is performed between the autonomous domains.

At step 33, dynamic interaction and dynamic collaboration of user information, network information and a network policy based on an integrated fixed, mobile and satellite IP foundation are performed between time-space adaptive network elements.

In the disclosure, a distributed autonomous network architecture (core functions of the network are distributed and deployed to form homogeneous distributed network units with different functions) is adopted. The network elements in the designated area are divided into the plurality of autonomous domains based on the clustering algorithm of elements such as time, space, node capability, network function and communication connection. Division of the autonomous domains involves low-earth orbit, medium-earth orbit, geostationary orbit satellites and mobile/fixed network devices. The intra-domain networking and the inter-domain networking are autonomously constructed based on a dynamic connection relationship. The point-to-point cooperative communication is performed within the autonomous domain, and the group-to-group cooperative communication is performed between the autonomous domains. The dynamic interaction and dynamic collaboration of the user information, the network information and the network policy based on the integrated fixed, mobile and satellite IP foundation are performed between the time-space adaptive network elements.

Figure 4:
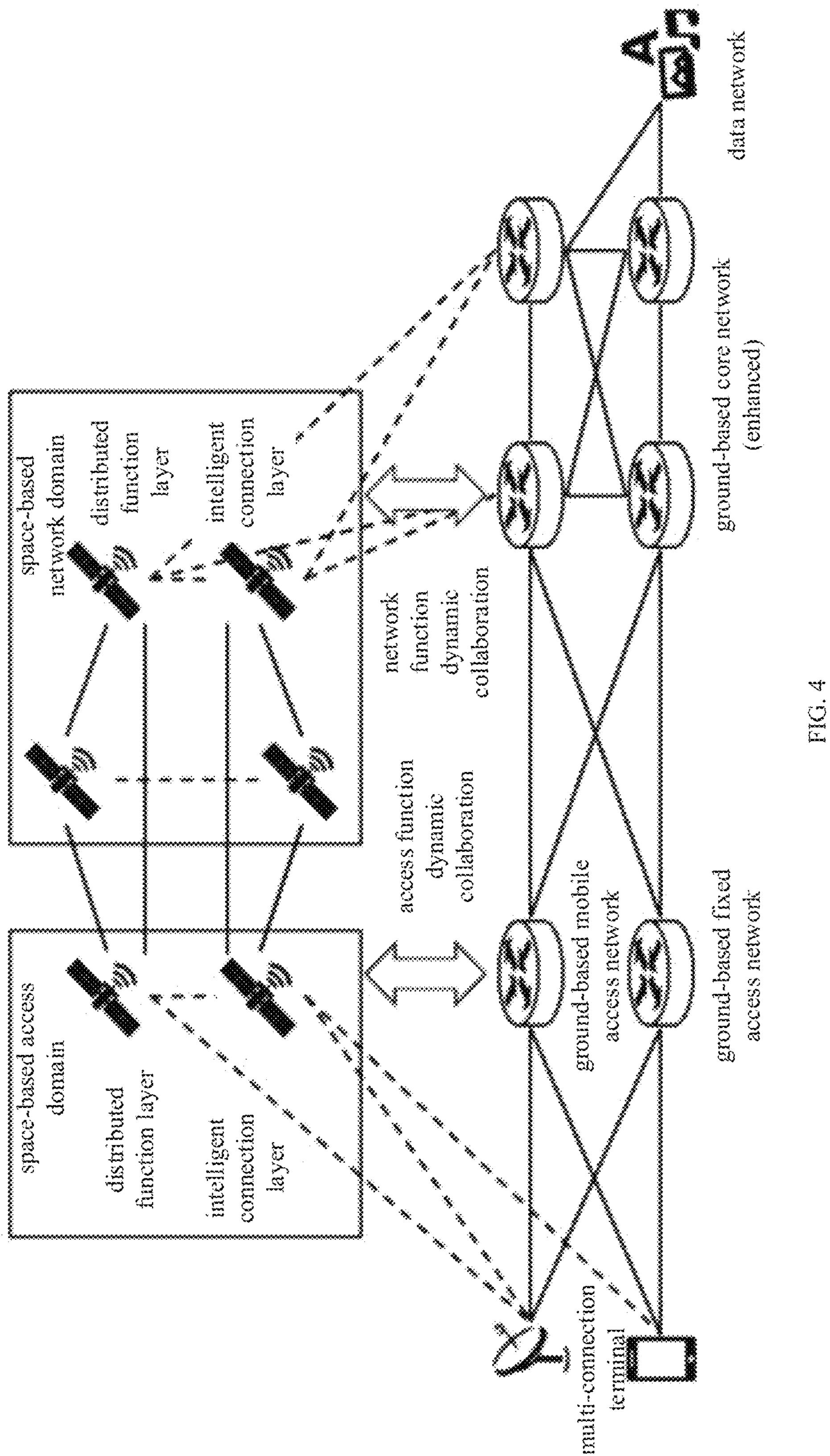
FIG. 4 is a diagram illustrating a distributed autonomous network architecture according to embodiments of the disclosure.

A distributed autonomous network architecture formed by the heterogeneous network element dynamic collaboration method is shown in FIG. 4. The integrated fixed, mobile and satellite network in FIG. 4 is divided into 4 autonomous domains, such as space-based/ground-based access domains and space-based/ground-based network domains. The autonomous domain is respectively divided into a distributed function layer and an intelligent connection layer. Networking within the autonomous domain and networking between the autonomous domains are established. Fixed, mobile and satellite access function dynamic collaboration is performed within the space-based/ground-based access domains, and fixed, mobile and satellite network function dynamic collaboration is performed within the space-based/ground-based network domains.

According to embodiments of the disclosure, the network function atomization segmenting method based on the time, the space and the node capability, performs the minimum granularity segmentation on the extracted and grouped network functions in combination with the node capability of the designated area, and groups the network functions into network atomic functions, and constructs network atomic function resource pools in the area. The network element dynamic arrangement and integration method based on the network atomic functions, autonomously arranges and integrates the network atomic functions into the network molecular functions by adding the timing relationship, the logical relationship and the geographic relationship among the network atomic functions; and autonomously arranges and integrates the group of network molecular functions into the network element, which self-organizes and dynamically loads and maintains the network element on the space-based node or the ground-based node. According to embodiments of the disclosure, in the heterogeneous network element dynamic collaboration method, the network elements in the designated area are divided into the plurality of autonomous domains based on the clustering algorithm of elements such as time, space, node capability, network function and communication connection, and the intra-domain networking and the inter-domain networking are autonomously constructed based on a dynamic connection relationship. The point-to-point cooperative communication is performed within the autonomous domain, and the group-to-group cooperative communication is performed between the autonomous domains.

According to embodiments of the disclosure, the type of the network element and the network function of the network element are configured in quasi-real-time and autonomously, that is, the same network element is deployed in different network environments (that is, the time, the space and the node capability are different), and the network function included in the different network environments may be different. In the disclosure, organization of network elements and network functions is dynamically adjusted based on elements such as the time, the space and the node capability, to adapt to a topologically dynamic and node heterogeneous, integrated fixed, mobile and satellite network, so that system capacity/system performance may achieve asymptotic optimality (i.e. convergence to an optimal solution under specific time, space and node capability).

According to embodiments of the disclosure, the network elements in the designated area are divided into the plurality of autonomous domains based on the clustering method, and the intra-domain networking and the inter-domain networking are autonomously constructed based on the dynamic connection relationship. The point-to-point cooperative communication is performed within the autonomous domains, and the group-to-group cooperative communication is performed between the autonomous domains. Therefore, in the disclosure, a dynamic connection relationship between network elements is formed based on autonomous collaboration, overall efficiency of connection reconstruction for the network is controllable, and a stable network may still be converged in a topologically dynamic environment.

Figures 5, 6:
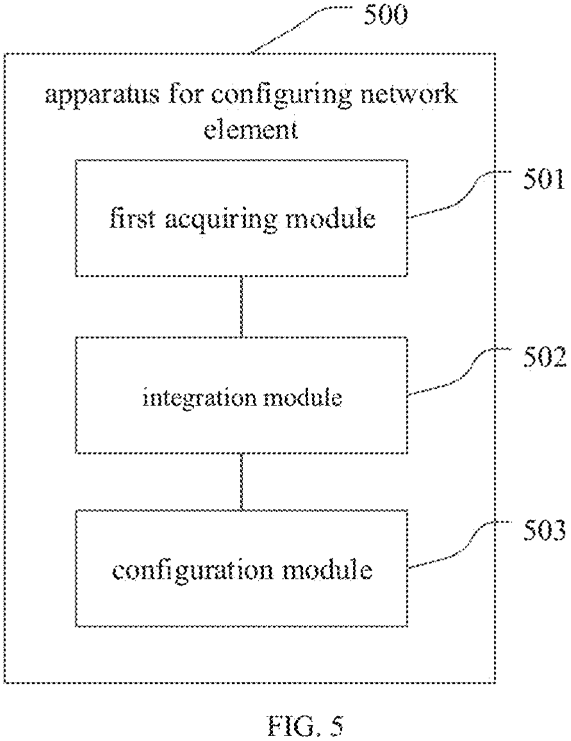
FIG. 5 is a block diagram illustrating an apparatus for configuring a network element according to embodiments of the disclosure.
FIG. 6 is a block diagram illustrating a communication device according to embodiments of the disclosure.

Referring to FIG. 5, FIG. 5 is a block diagram illustrating an apparatus for configuring a network element according to embodiments of the disclosure. As illustrated in FIG. 5, an apparatus 500 for configuring the network element includes a first acquiring module 501, an integration module 502 and a configuration module 503.

The first acquiring module 501 is configured to acquire a plurality of network atomic functions of a node within a target area, in which the node within the target area includes a target node.

The integration module 502 is configured to integrate the plurality of network atomic functions into a plurality of network molecular functions, in which each of the plurality of network molecular functions includes at least one network element atomic function.

The configuration module 503 is configured to configure the network element according to node capability information of the target node, in which the network element corresponds to a group of network molecular functions, and the group of network molecular functions includes at least one network molecular function.

Optionally, the first acquiring module 501 specifically may include a first acquiring unit and a segmentation unit.

The first acquiring unit is configured to acquire network function information of the node within the target area within a preset time period.

The segmentation unit is configured to segment and group a network function of the node within the target area into the plurality of network atomic functions according to the network function information.

Optionally, the integration module 502 specifically may include a second acquiring unit and a first integration unit.

The second acquiring unit is configured to acquire at least one of a timing relationship, a logical relationship or a geographic relationship among the plurality of network atomic functions.

The first integration unit is configured to integrate the plurality of network atomic functions into the plurality of network molecular functions according to the at least one of the timing relationship, the logical relationship or the geographic relationship among the plurality of network atomic functions.

Optionally, the apparatus 500 for configuring the network element may further include an establishment module and an injection module.

The establishment module is configured to establish a plurality of network atomic function resource pools.

The injection module is configured to inject the plurality of network atomic functions into corresponding network atomic function resource pools, respectively.

The integration module 502 may further include a second integration unit.

The second integration unit is configured to integrate a plurality of network atomic functions in the plurality of network atomic function resource pools into the plurality of network molecular functions.

Optionally, the apparatus 500 for configuring the network element may further include a second acquiring module, a division module and a construction module.

The second acquiring module is configured to acquire a plurality of network elements within the target area.

The division module is configured to divide the plurality of network elements into at least one autonomous domain.

The construction module is configured to construct intra-domain networking and inter-domain networking according to the at least one autonomous domain. The intra-domain networking is configured to achieve point-to-point communication between network elements within the autonomous domain, and the inter-domain networking is configured to achieve group-to-group communication between autonomous domains.

Optionally, the division module specifically may include a division unit.

The division unit is configured to divide the plurality of network elements into the at least one autonomous domain according to a clustering algorithm.

The clustering algorithm is implemented according to at least one of time, space, node capability information, network function or communication connection information.

The apparatus 500 for configuring the network element may achieve each process of method embodiments in FIG. 1 according to embodiments of the disclosure, and achieve the same beneficial effect, which will not be repeated in order to avoid repetition.

A communication device is further provided according to embodiments of the disclosure Since the principle that the electronic device solves the problem is similar to the method for configuring the network element as illustrated in FIG. 1 according to embodiments of the disclosure, an implementation of the communication device may refer to an implementation of the method, which will not be repeated for repetition. As illustrated in FIG. 6, the communication device in embodiments of the disclosure includes: a memory 620, a transceiver 610 and a processor 600.

The memory 620 is configured to store a computer program. The transceiver 610 is configured to transmit and receive data under a control of the processor. The processor 600 is configured to read the computer program in the memory 620 and perform operations of:

acquiring a plurality of network atomic functions of a node within a target area;

integrating the plurality of network atomic functions into a plurality of network molecular functions, in which each of the plurality of network molecular functions includes at least one network element atomic function; and configuring the network element for the node according to node capability information of the node, in which the network element corresponds to a group of network molecular functions, and the group of network molecular functions includes at least one network molecular function.

In FIG. 6, a bus architecture may include any number of interconnected buses and bridges, and specifically link one or more processors represented by the processor 600 and various circuits of memories represented by the memory 620. The bus architecture may further link various other circuits such as peripheral equipment, voltage regulators and power management circuits, which are well known in the art and will not be further described herein. A bus interface provides an interface. The transceiver 610 may be a plurality of elements, i.e., include a transmitter and a transceiver, providing units for communicating with various other apparatuses on transmission media. The processor 600 is in charge of managing the bus architecture and general processing, and the memory 620 may store data used by the processor 600 in performing operations.

The processor 600 may be a central processing unit (CPU), an application specific integrated circuit (ASIC), a field-programmable gate array (FPGA) or a complex programmable logic device (CPLD). The processor 130 may adopt a multi-core architecture.

Optionally, acquiring the plurality of network atomic functions of the node within the target area includes: acquiring network function information of the node within the target area within a preset time period; and segmenting and grouping a network function of the node within the target area into the plurality of network atomic functions according to the network function information.

Optionally, integrating the plurality of network atomic functions into the plurality of network molecular functions includes: acquiring at least one of a timing relationship, a logical relationship or a geographic relationship among the plurality of network atomic functions; and integrating the plurality of network atomic functions into the plurality of network molecular functions according to the at least one of the timing relationship, the logical relationship or the geographic relationship among the plurality of network atomic functions.

Optionally, the processor 600 is further configured to read a program in a memory 620, to perform steps of: establishing a plurality of network atomic function resource pools; and injecting the plurality of network atomic functions into corresponding network atomic function resource pools, respectively; in which integrating the plurality of network atomic functions into the plurality of network molecular functions includes: integrating a plurality of network atomic functions in the plurality of network atomic function resource pools into the plurality of network molecular functions.

Optionally, the processor 600 is further configured to read the program in the memory 620, to perform steps of: acquiring a plurality of network elements within the target area; dividing the plurality of network elements into at least one autonomous domain; and constructing intra-domain networking and inter-domain networking according to the at least one autonomous domain, in which the intra-domain networking is configured to achieve point-to-point communication between network elements within the autonomous domain, and the inter-domain networking is configured to achieve group-to-group communication between autonomous domains.

Optionally, dividing the plurality of network elements into the at least one autonomous domain includes: dividing the plurality of network elements into the at least one autonomous domain according to a clustering algorithm; in which the clustering algorithm is implemented according to at least one of: time, space, node capability information, network function or communication connection information.

The communication device according to embodiments of the disclosure may perform method embodiments as illustrated in FIG. 1, and the implementation principle and the technical effect are similar, which will not be repeated herein.

A readable storage medium storing a program is further provided according to embodiments of the disclosure. When the program is executed by a processor, processes of the method embodiments in FIG. 1 may be implemented, and the same technical effect may be achieved, which will not be repeated herein to avoid repetition.

According to several embodiments provided in the disclosure, it is to be understood that the disclosed method and apparatus may be implemented in other ways. For example, the apparatus embodiments are merely illustrative, such as division of units, only a logical function division. There may be additional division modes when actual implementation, such as a plurality of units or components may be combined or may be integrated into another system, or some features may be omitted, or not performed. The coupling or direct coupling or communication connection of each other shown or discussed may be an indirect coupling or communication connection through some interfaces, devices, or units, which may be electrical, mechanical or in other forms.

In addition, functional units in embodiments of the disclosure may be integrated in a processing unit, or may be physically existed separately, or two or more units may be integrated in one unit. The above integrated unit may be implemented in the form of a hardware or in the form of a hardware and a software function unit.

The integration unit implemented in the form of the software function unit may be stored in a computer-readable storage medium. The software function unit is stored in a storage medium including several instructions so that a computer device (which may be a personal computer, a server or a network device is caused to perform all or part of steps of the transceiving method in embodiments of the disclosure. The forgoing storage medium includes a USB disk, a mobile hard disk, a read-only memory (ROM), a random-access memory (RAM), a magnetic disk or an optical disk and other media that may store program codes.

The foregoing is preferred embodiments of the disclosure. It should be noted that, for those art skilled in the art, several improvements and amendments may be made without departing from the principles of the disclosure, and these improvements and amendments are also within the protection scope of the disclosure.

What is claimed is:

1. A method for configuring a network element, comprising:

acquiring a plurality of network atomic functions of a node within a target area;

wherein each of the plurality of network atomic functions is an essential basic function element of each node network function;

integrating the plurality of network atomic functions into a plurality of network molecular functions, wherein each of the plurality of network molecular functions comprises at least one network atomic function, and each of the plurality of network molecular functions is a whole constituted by combining the network atomic functions according to a certain arrangement order and space; and configuring the network element for the node according to node capability information of the node, wherein the network element corresponds to a group of network molecular functions, and the group of network molecular functions comprises at least one network molecular function, wherein the node capability information comprises a node resource, node mobility, node robustness and a support degree of a network function.

2. The method according to claim 1, wherein acquiring the plurality of network atomic functions of the node within the target area comprises:

acquiring network function information of the node within the target area within a preset time period; and segmenting and grouping a network function of the node within the target area into the plurality of network atomic functions according to the network function information.

3. The method according to claim 1, wherein integrating the plurality of network atomic functions into the plurality of network molecular functions comprises:

acquiring at least one of a timing relationship, a logical relationship or a geographic relationship among the plurality of network atomic functions; and integrating the plurality of network atomic functions into the plurality of network molecular functions according to the at least one of the timing relationship, the logical relationship or the geographic relationship among the plurality of network atomic functions.

4. The method according to claim 1, further comprising:

establishing a plurality of network atomic function resource pools; and injecting the plurality of network atomic functions into corresponding network atomic function resource pools, respectively;

wherein integrating the plurality of network atomic functions into the plurality of network molecular functions comprises integrating a plurality of network atomic functions in the plurality of network atomic function resource pools into the plurality of network molecular functions.

5. The method according to claim 1, further comprising:

acquiring a plurality of network elements within the target area;

dividing the plurality of network elements into at least one autonomous domain according to the node capability information; and constructing intra-domain networking and inter-domain networking according to the at least one autonomous domain, wherein the intra-domain networking is configured to achieve point-to-point communication between network elements within the autonomous domain, and the inter-domain networking is configured to achieve group-to-group communication between autonomous domains.

6. The method according to claim 5, wherein dividing the plurality of network elements into the at least one autonomous domain comprises:

dividing the plurality of network elements into the at least one autonomous domain according to a clustering algorithm; wherein the clustering algorithm is implemented according to the node capability information and at least one of:

time, space, network function or communication connection information.

7. The method according to claim 6, wherein when the clustering algorithm is implemented according to the node capability information and the network function, the network function comprises a control plane capability, a user plane capability, a data plane capability, a management plane capability and a service plane capability.

8. A communication device, comprising:

a transceiver;

a memory for storing a program; and a processor configured to perform the steps of:

acquiring a plurality of network atomic functions of a node within a target area, wherein each of the plurality of network atomic functions is an essential basic function element of each node network function;

integrating the plurality of network atomic functions into a plurality of network molecular functions, wherein each of the plurality of network molecular functions comprises at least one network atomic function, and each of the plurality of network molecular functions is a whole constituted by combining the network atomic functions according to a certain arrangement order and space; and configuring the network element for the node according to node capability information of the node, wherein the network element corresponds to a group of network molecular functions, and the group of network molecular functions comprises at least one network molecular function, wherein the node capability information comprises a node resource, node mobility, node robustness and a support degree of a network function.

9. The device according to claim 8, wherein acquiring the plurality of network atomic functions of the node within the target area comprises:

acquiring network function information of the node within the target area within a preset time period; and segmenting and grouping a network function of the node within the target area into the plurality of network atomic functions according to the network function information.

10. The device according to claim 8, wherein integrating the plurality of network atomic functions into the plurality of network molecular functions comprises:

acquiring at least one of a timing relationship, a logical relationship or a geographic relationship among the plurality of network atomic functions; and integrating the plurality of network atomic functions into the plurality of network molecular functions according to the at least one of the timing relationship, the logical relationship or the geographic relationship among the plurality of network atomic functions.

11. The device according to claim 8, wherein the processor is further configured to perform the steps of:

establishing a plurality of network atomic function resource pools; and injecting the plurality of network atomic functions into corresponding network atomic function resource pools, respectively; wherein wherein integrating the plurality of network atomic functions into the plurality of network molecular functions comprises:

integrating a plurality of network atomic functions in the plurality of network atomic function resource pools into the plurality of network molecular functions.

12. The device according to claim 8, wherein the processor is further configured to perform the steps of:

acquiring a plurality of network elements within the target area;

dividing the plurality of network elements into at least one autonomous domain according to the node capability information; and constructing intra-domain networking and inter-domain networking according to the at least one autonomous domain, wherein the intra-domain networking is configured to achieve point-to-point communication between network elements within the autonomous domain, and the inter-domain networking is configured to achieve group-to-group communication between autonomous domains.

13. The device according to claim 12, wherein dividing the plurality of network elements into the at least one autonomous domain comprises:

dividing the plurality of network elements into the at least one autonomous domain according to a clustering algorithm; wherein the clustering algorithm is implemented according to the node capability information and at least one of:

time, space, network function or communication connection information.

14. The device according to claim 13, wherein when the clustering algorithm is implemented according to the node capability information and the network function, the network function comprises a control plane capability, a user plane capability, a data plane capability, a management plane capability and a service plane capability.

15. A non-transitory computer-readable storage medium storing a program, wherein when the program is executed by a processor of a communication device, steps of a method for configuring a network element are implemented, the method comprising:

acquiring a plurality of network atomic functions of a node within a target area, wherein each of the plurality of network atomic functions is an essential basic function element of each node network function;

integrating the plurality of network atomic functions into a plurality of network molecular functions, wherein each of the plurality of network molecular functions comprises at least one network atomic function, and each of the plurality of network molecular functions is a whole constituted by combining the network atomic functions according to a certain arrangement order and space; and configuring the network element for the node according to node capability information of the node, wherein the network element corresponds to a group of network molecular functions, and the group of network molecular functions comprises at least one network molecular function, wherein the node capability information comprises a node resource, node mobility, node robustness and a support degree of a network function.

16. The non-transitory computer-readable storage medium according to claim 15, wherein acquiring the plurality of network atomic functions of the node within the target area comprises:

acquiring network function information of the node within the target area within a preset time period; and segmenting and grouping a network function of the node within the target area into the plurality of network atomic functions according to the network function information.

17. The non-transitory computer-readable storage medium according to claim 15, wherein integrating the plurality of network atomic functions into the plurality of network molecular functions comprises:

acquiring at least one of a timing relationship, a logical relationship or a geographic relationship among the plurality of network atomic functions; and integrating the plurality of network atomic functions into the plurality of network molecular functions according to the at least one of the timing relationship, the logical relationship or the geographic relationship among the plurality of network atomic functions.

18. The non-transitory computer-readable storage medium according to claim 15, wherein the method further comprises:

establishing a plurality of network atomic function resource pools; and injecting the plurality of network atomic functions into corresponding network atomic function resource pools, respectively; wherein wherein integrating the plurality of network atomic functions into the plurality of network molecular functions comprises:

integrating a plurality of network atomic functions in the plurality of network atomic function resource pools into the plurality of network molecular functions.

19. The non-transitory computer-readable storage medium according to claim 15, wherein the method further comprises:

acquiring a plurality of network elements within the target area;

dividing the plurality of network elements into at least one autonomous domain according to the node capability information; and constructing intra-domain networking and inter-domain networking according to the at least one autonomous domain, wherein the intra-domain networking is configured to achieve point-to-point communication between network elements within the autonomous domain, and the inter-domain networking is configured to achieve group-to-group communication between autonomous domains.

20. The non-transitory computer-readable storage medium according to claim 19, wherein dividing the plurality of network elements into the at least one autonomous domain comprises:

dividing the plurality of network elements into the at least one autonomous domain according to a clustering algorithm; wherein the clustering algorithm is implemented according to the node capability information and at least one of:

time, space, network function or communication connection information.

* * * * *